US011940113B2

(12) United States Patent
Brauner et al.

(10) Patent No.: US 11,940,113 B2
(45) Date of Patent: Mar. 26, 2024

(54) ILLUMINATION DEVICE FOR MOTOR VEHICLE HEADLIGHT WITH ILLUMINATION UNITS ARRANGED NEXT TO ONE ANOTHER

(71) Applicant: ZKW Group GmbH, Wieselburg (AT)

(72) Inventors: Nina Brauner, Altlengbach (AT); Sunjung Park, Seoul (KR); Kristijan Velebit, Cazma (HR); Dominic Gottsmann, Waasen (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/218,398

(22) Filed: Jul. 5, 2023

(65) Prior Publication Data

US 2024/0011613 A1 Jan. 11, 2024

(30) Foreign Application Priority Data

Jul. 7, 2022 (EP) .................................... 22183552

(51) Int. Cl.
*F21S 41/265* (2018.01)
*F21S 41/143* (2018.01)
*F21S 41/151* (2018.01)

(52) U.S. Cl.
CPC ........... *F21S 41/265* (2018.01); *F21S 41/143* (2018.01); *F21S 41/151* (2018.01)

(58) Field of Classification Search
CPC ....... F21S 41/143; F21S 41/151; F21S 41/265
See application file for complete search history.

(56) References Cited

U.S. PATENT DOCUMENTS

| | | | |
|---|---|---|---|
| 2018/0087737 | A1 | 3/2018 | Hermitte et al. |
| 2018/0292061 | A1 | 10/2018 | Taudt et al. |
| 2019/0234571 | A1 | 8/2019 | Gromfeld |
| 2020/0032973 | A1 | 1/2020 | Renaud et al. |
| 2021/0231283 | A1 | 7/2021 | Taudt et al. |
| 2022/0170607 | A1 | 6/2022 | Mukojima |

OTHER PUBLICATIONS

Extended European Search Report for European Patent Application No. 22183552.3, dated Nov. 15, 2022 (5 Pages).

*Primary Examiner* — Matthew J. Peerce
(74) *Attorney, Agent, or Firm* — Eversheds Sutherland (US) LLP

(57) ABSTRACT

An illumination device (1) for a motor vehicle headlight, including illumination units arranged next to one another, which respectively have a light source, primary optical device, and a secondary optical device. The primary optical devices are held in a common holding element formed by a transparent body. In the body, an overcoupling protective device in the form of a through hole in the body is provided between two adjacent receiving through holes in which a primary optical device is respectively held. The through hole of the overcoupling protective device is delimited by two side faces, which face the receiving through holes of the primary optical devices. Light deflection means are designed to deflect at least part of the rays of light entering the body such that part of the rays of light does not enter the adjacent illumination unit or strike the secondary optical device of the adjacent illumination unit.

20 Claims, 3 Drawing Sheets

ILLUMINATION DEVICE FOR MOTOR VEHICLE HEADLIGHT WITH ILLUMINATION UNITS ARRANGED NEXT TO ONE ANOTHER

CROSS-REFERENCE TO RELATED APPLICATIONS

This application claims priority to European Patent Application No. 22183552.3, filed Jul. 7, 2022, which is incorporated herein by reference.

FIELD OF THE INVENTION AND DESCRIPTION OF PRIOR ART

The invention relates to an illumination device for a motor vehicle headlight, comprising at least two illumination units arranged next to one another, wherein each illumination unit respectively comprises: (i) at least one light source, (ii) a transparent primary optical device associated with the at least one light source, and (iii) a transparent secondary optical device, wherein the primary optical device of each illumination unit is designed to direct the light emitted by the at least one light source associated therewith onto the secondary optical device in such a way that at least one light distribution is produced by the secondary optical device of the illumination unit, wherein the illumination device has a holding element, which holds the primary optical devices of the illumination units, wherein the holding element is formed by a body made of a transparent material, wherein the body has adjacent receiving through holes, in which a primary optical device is respectively arranged, wherein a primary optical device is respectively attached to at least one boundary surface of the receiving through hole, which faces an adjacent receiving through hole, wherein the receiving through holes are spaced apart from one another.

With regard to the directions used, an arrangement of the illumination device in a horizontal position is assumed. In this context, “next to one another” means “side by side”. In another arrangement, e.g. with an arrangement rotated 90°, “next to one another” can also be understood synonymously with “one above the other” or “one below the other”.

Furthermore, the invention relates to a motor vehicle headlight comprising such an illumination device.

Such illumination devices for motor vehicle headlights or for motor vehicles are known and serve, for example, to produce ADB (adaptive driving beam), AFS (adaptive front-lighting system) or static systems (area in front of the vehicle, static high beam), wherein it is also possible to combine these light functions.

A holding element, which is transparent, in particular translucent and/or light-conducting, is provided to hold the primary optical devices of the two or more illumination units. This design makes it possible, for example, to produce the primary optical devices and the holding element together in an injection moulding process.

So-called stray light, i.e. light from a light source that unwantedly enters the holder via its primary optical device, can propagate in the holder by total internal reflection and escape again at unwanted points. For example, light from the light source of a first illumination unit can emerge in the region of a second illumination unit and appear in the outside space via the secondary optical device of the second illumination unit, wherein this can lead to a negative influence on the light distribution produced by the second illumination unit.

SUMMARY OF THE INVENTION

An object of the invention is to prevent or reduce light entering the holding element.

This object is achieved by means of an illumination device mentioned in the introduction by virtue of the fact that according to the invention an overcoupling protective device is arranged in the body between two adjacent receiving through holes, wherein the overcoupling protecting device is formed by a through hole in the body, wherein the through hole of the overcoupling protective device is delimited by two side faces, which side faces face the receiving through holes in which the primary optical devices are arranged, and wherein at least one of the side faces, namely that side face or those side faces whose opposite boundary surface of a receiving through hole is contacted by the primary optical device arranged in the receiving through hole has light deflection means, which are designed to deflect at least part, preferably all, of the rays of light entering the body from the primary optical device facing the side face and contacting the opposite boundary surface, and striking the side surface, in such a way that this part of the rays of light does not enter the adjacent illumination unit or strike the secondary optical device of the adjacent illumination unit.

For example, a primary optical device contacts the boundary surface(s) directly, in particular over an area, or, as described below, a contact element is provided, with which the connection is established.

It can advantageously be provided that the holding element and the primary optical devices are formed integrally and are preferably made of the same material.

It is preferably provided that a primary optical device contacts the holding element at exactly, in particular an opposite, boundary surfaces.

In this case, no contact is provided on the upper and lower boundary surface of the receiving through hole, which can prevent stray light entering the holding element via these boundary surfaces.

In particular, it can be provided that the light deflection means are designed to deflect incident rays of light in such a way that the deflected ray of light has a greater up/down component (z component) than the incident ray of light, and/or the light deflection means are designed to deflect incident rays of light against a light emission direction of the respective illumination unit.

The directions refer to an assumed arrangement of the illumination device in a horizontal position, as described in the introduction. In the case of an arrangement rotated relative to this assumed arrangement, the directions of course change accordingly, e.g. with a 90° rotated arrangement, the up/down components become left/right components.

Rays of light are thus deflected to a greater extent upwards or downwards and either propagate in the holding element or emerge from it, so far upwards or downwards and directed upwards/downwards that they do not strike the secondary optics or basically do not enter the adjacent illumination unit.

It is particularly preferably provided that the light deflection means comprise one or more light deflection surfaces, which deflect the incident rays of light in such a way that these rays of light do not enter the adjacent illumination unit or strike a region of the secondary optical device that is associated with an adjacent illumination device.

Particularly preferably, the rays of light are generally deflected in such a way that they are not redirected forwards such that they cannot reach secondary optics of the adjacent secondary optical device.

It can be provided that the primary optical devices of the at least two illumination units respectively have a main light emission direction, wherein, for example, the main light emission directions are substantially aligned in the same direction, in particular parallel to each other.

It can be provided that the side faces of the overcoupling protective device respectively run parallel to a main light emission direction of the primary optical device of the adjacent illumination unit.

It can be provided that the side faces of the overcoupling protective device run vertically.

By way of example, it can be provided that the light deflection means are designed in the form of a grain or comprise grooves or are designed in the form of grooves, wherein the grooves preferably extend in a horizontal direction, in particular in a main light emission direction of the primary optical device of the adjacent illumination unit.

For example, the grooves are straight grooves, thus extending along a straight longitudinal direction, and preferably adjacent grooves are parallel to each other.

The grooves can be formed in a cross-section, in particular in a cross-section normal to their longitudinal direction, e.g. triangular, in the form of a partial or semicircle, prismatic, rounded, etc.

It can further be provided that at least one of the primary optical devices, preferably every primary optical device, comprises one or more projection optical elements, wherein if there are two or more projection optical elements, they are preferably arranged in at least one row.

Each of these projection optical elements can be designed as a separate projection lens.

Each projection optical element can produce its own part of the light distribution of the illumination unit, e.g. a light segment.

The projection elements can be directly adjacent to each other and are preferably fixedly connected to one another, in particular formed integrally, particularly preferably from the same material.

The lines run horizontally and transversely, in particular at 90° to the light emission direction X1, X2 of the respective illumination unit.

The projection optical device is connected to the holding element with at least one outer projection optical element.

It can further advantageously be provided that the at least one primary optical device contacts the at least one boundary surface via a wedge-shaped contact element, which is arranged between the boundary surface and the primary optical device, and wherein a narrower wedge surface of the contact element contacts the primary optical device and an opposite wider wedge surface contacts the boundary surface.

The contact element is preferably formed from the same material as the holding element and the primary optical device; the holding element, contact element and primary optical device are preferably integrally formed with one another.

The use of such a contact element also helps reduce stray light as in this way the size of the region with which the projection optical device is connected to the holder can be kept small such that the possibility of light transition is low, wherein at the same time a good level of stability of the connection can be guaranteed.

The contact element or contact elements can, in particular geometrically, be designed such that light is deflected backwards, i.e. in a direction away from the secondary optical devices and/or be designed, in particular geometrically, in such a way that light is prevented from exiting the contact element/contact elements.

It can be provided that at least the light source of an illumination unit, in particular of every illumination unit, is an LED or light-emitting diode, and wherein, if several light sources are provided, they are preferably arranged in one or more rows.

The rows of the light sources are, for example, associated with the rows of the primary optical device in such a manner that each projection optical element is assigned at least one light source/LED, preferably exactly one light source/LED, wherein preferably the associated light sources/LEDs are exclusively assigned to this one projection optical element.

The light sources of one illumination unit can preferably be controlled independently of those of other illumination units.

The light sources of one illumination unit can preferably be controlled independently of the other light sources of this illumination unit, or groups of light sources of an illumination unit can be controlled by other groups of light sources of the illumination unit.

The primary optical elements are, for example, lenses, in particular biconvex lenses.

The light sources, in particular LEDs, are preferably respectively located in front of a focal point of their primary optical element—as seen in the direction of light propagation—and are enlarged, wherein the image of the light source is in particular a virtual image.

The secondary optical devices are preferably arranged in such a manner that their focal point is produced substantially in the, in particular virtual, enlarged image of the light source, in particular LED, formed by the primary optical element.

For example, the secondary optical devices are projection optics.

It can be provided that the at least one projection optical device or projection optical elements of the at least one projection optical device are biconvex.

It has transpired that this design provides additional stray light protection as when light enters through the convex entry surface, a light beam enters the optical device in a collimated manner such that it can no longer spill over into adjacent optics to such an extent.

It is advantageous when the secondary optical devices are formed as a secondary optical device assembly.

The secondary optical devices are thus realised in a single component, which has different optically active regions (=secondary optical devices), preferably (exactly) one per illumination unit.

It can further be provided that a screen, in particular a wall-like screen, is arranged between at least two illumination units, which screen extends from the holding element to the secondary optical devices.

The screen or the plurality of screens and the holding element preferably have an upper and a lower part, which can be put together on top of each other.

For example, a screen abuts the holding element (100) such that no light from the illumination unit can enter adjacent illumination units via a distance between the screens and the holding elements.

The one or more screens run approximately parallel to the main light emission direction of an adjacent illumination unit or parallel to the angle bisector of the main light emission direction of the two adjacent illumination units.

The one or more screens are, in particular, planar and run substantially vertically.

BRIEF DESCRIPTION OF THE DRAWINGS

The invention is explained in more detail below based on the drawing. In this

DETAILED DESCRIPTION OF EMBODIMENTS OF THE INVENTION

Figure 1:
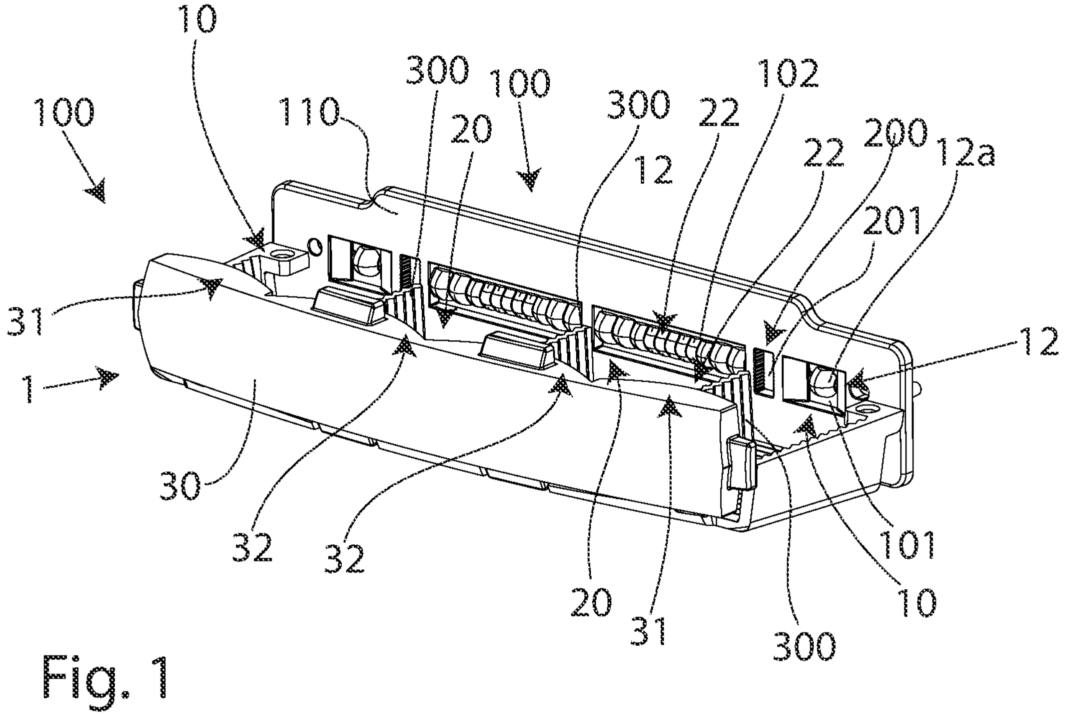
FIG. 1 shows an illumination device according to the invention in a perspective view from an oblique front.
Figure 2:
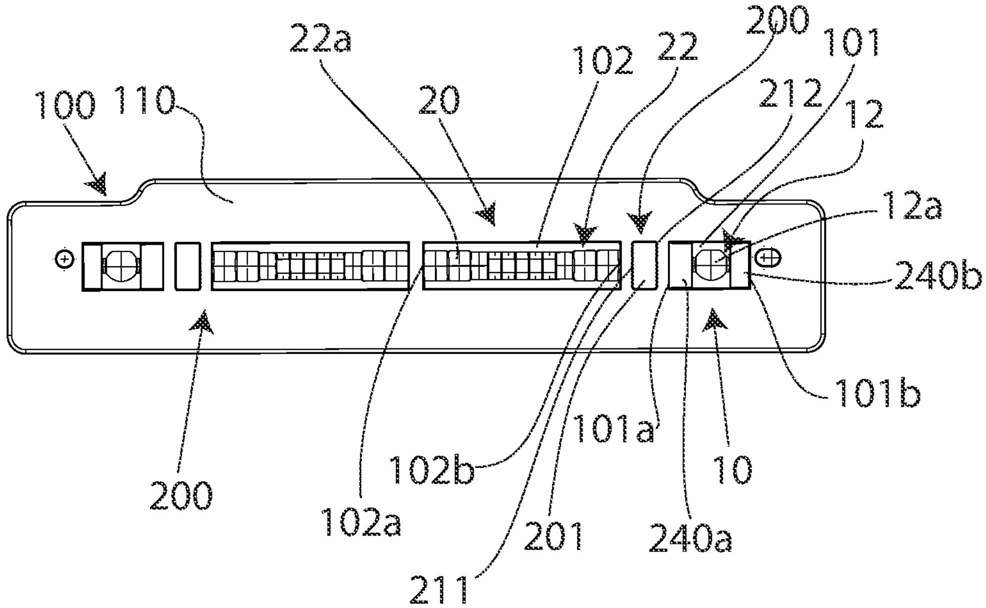
FIG. 2 shows the holding element from FIG. 1 in a view from the front.
Figure 3:
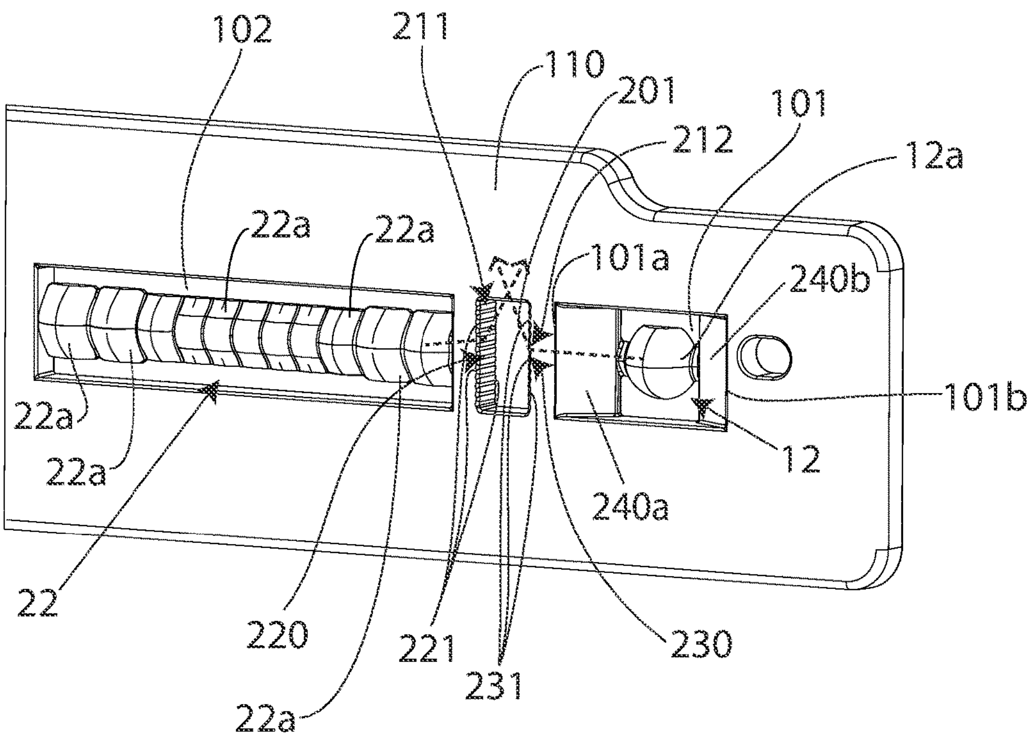
FIG. 3 shows a section of the holding element from FIG. 2 in a slightly rotated position.
Figure 4:
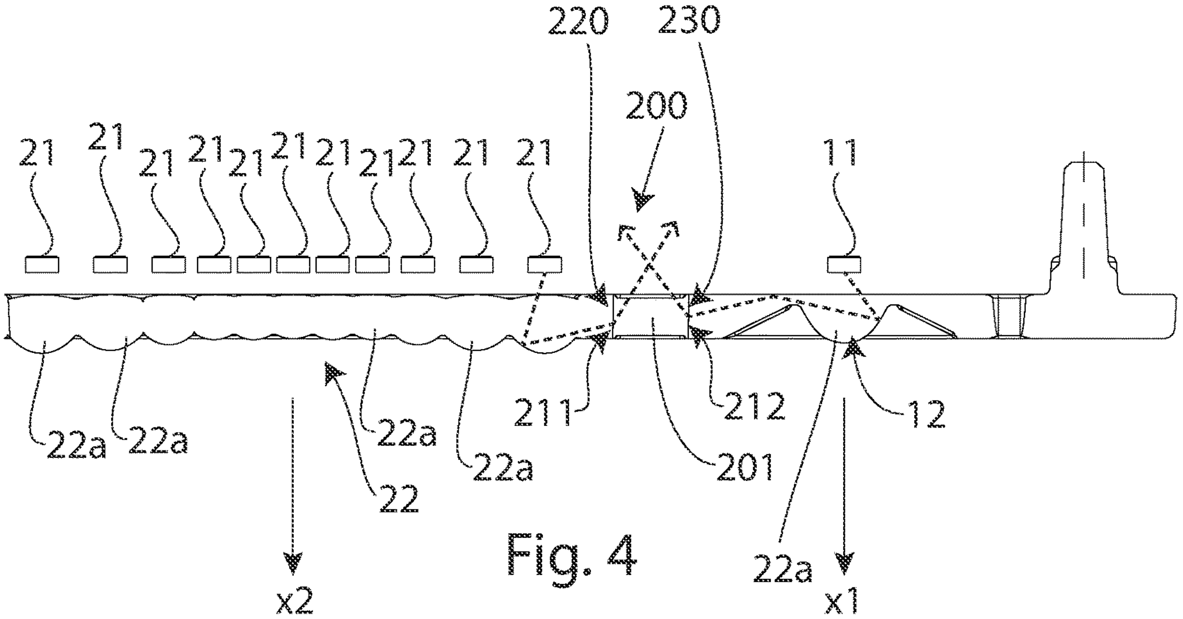
FIG. 4 shows the section from FIG. 3 in a horizontal section, FIG. 5 once again shows the section from FIG. 3, in a view from the front.
Figure 5:
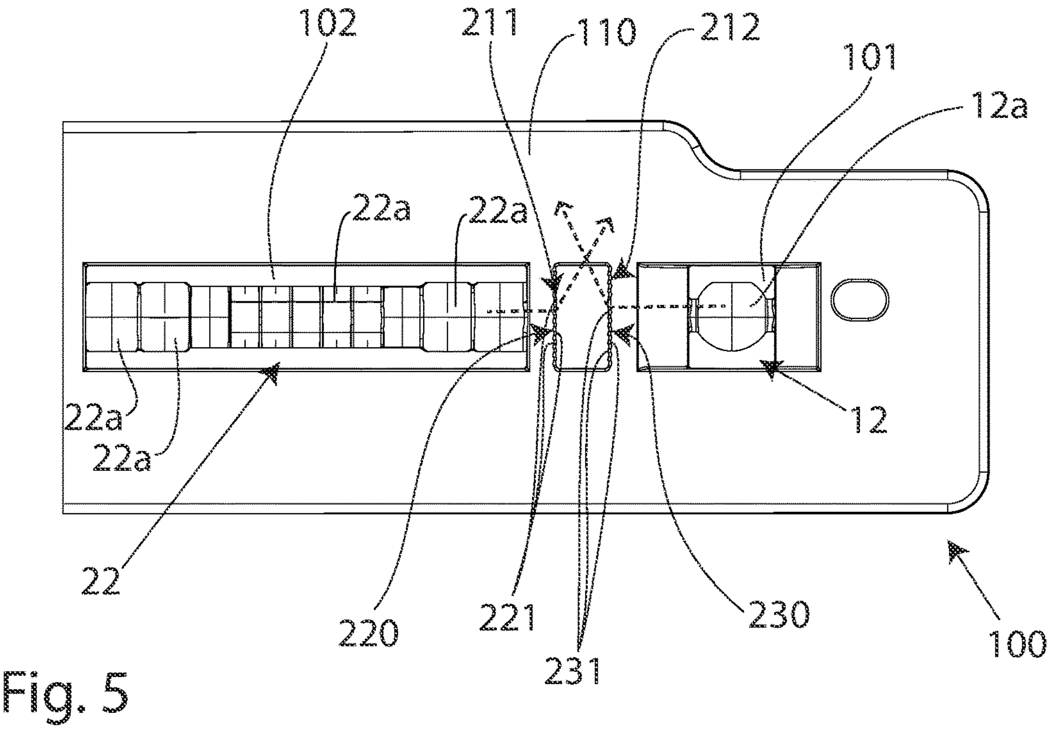

The structure of an exemplary illumination device 100 according to the invention is first explained in more detail below based on FIGS. 1-5.

The illumination device 1 comprises at least two, in the specific example four, illumination units 10, 20 arranged next to one another. Each illumination unit 10, 20 respectively comprises

- at least one light source 11, 21 (FIG. 4),
- a transparent primary optical device 12, 22 associated with the at least one light source 11, 21,
- and a transparent secondary optical device 31, 32.

In the example shown, the primary optical devices 12 respectively comprise exactly one primary optical element 12*a*, the primary optical devices 22 respectively comprising a plurality of primary optical elements 22*a*, which are arranged next to one another in a horizontal line. The four primary optical devices 12, 22 are preferably likewise arranged in a line.

The lines run horizontally and transversely, in particular at 90° to a (main) light emission direction X1, X2 of the respective illumination unit 10, 20.

Each of these primary optical elements 12*a*, 22*a* can be designed as a separate projection lens.

It can be provided that the primary optical elements 12*a*, 22*a* are biconvex.

The light sources 11, 21 are preferably LEDs, wherein each primary optical element 12*a*, 22*a* is preferably assigned its own LED 11, 21. Each LED 11, 21 can, together with its primary optical element 12*a*, 22*a*, produce an image of the light source, in particular an enlarged image, for example in the form of a light segment.

The primary optical elements can be directly adjacent to each other and are preferably fixedly connected to one another, in particular formed integrally, particularly preferably from the same material.

The light sources of one illumination unit can preferably be controlled independently of those of other illumination units.

The light sources of one illumination unit can preferably be controlled independently of the other light sources of this illumination unit, or groups of light sources of an illumination unit can be controlled by other groups of light sources of the illumination unit.

The light sources, in particular LEDs, are preferably respectively located in front of a focal point of their primary optical element—as seen in the direction of light propagation—and are enlarged, wherein the image of the light source is in particular a virtual image.

The secondary optical devices are preferably arranged in such a manner that their focal point is produced substantially in the, in particular virtual, enlarged image of the light source, in particular LED, formed by the primary optical element.

For example, the secondary optical devices are projection optics.

In the example shown, the secondary optical devices 31, 32 are formed as a secondary optical device assembly 30. The secondary optical devices 31, 32 are thus realised in a single component, which has different optically active regions (=secondary optical devices), preferably one per illumination unit.

The primary optical device 11, 22 of each illumination unit 10, 20 is designed to direct the light emitted by the light sources 11, 21 associated therewith onto the secondary optical device 31, 32 in such a way that at least one light distribution is produced by the secondary optical device 31, 32 of the illumination unit 10, 20. For example, the light emitted by a light source onto a primary optical element is imaged by the primary optical element together with the associated secondary optical device in the far field, i.e. on a street, for example, as (partial) light distribution. All light sources of an illumination unit together form an (overall) light distribution in this way.

Examples of such light distributions or the corresponding light functions are

- ADB (adaptive driving beam),
- AFS (adaptive front-lighting system) or
- static systems (area in front of the vehicle, static high beam).

The illumination device 1 further has a holding element 100, which holds the primary optical devices 12, 22 of the illumination units 10, 20. The holding element 100 is formed by a body 110 made of a transparent material, wherein the body 110 has adjacent receiving through holes 101, 102, in which a primary optical device 12, 22 is respectively arranged.

The holding element 100 and the primary optical devices 12, 22 are preferably formed integrally and are preferably made of the same material.

Each primary optical device 12, 22 is connected to at least one respective boundary surface 101*a*, 101*b*, 102*a*, 102*b* of the receiving through hole 101, 102, in particular a lateral boundary surface. Each primary optical device 12, 22 is preferably connected to two, preferably lateral, opposing boundary surfaces; in the specific example, the primary optical device 22 is connected to the boundary surfaces 102*a*, 102*b* and the primary optical device 12 is connected to the boundary surfaces 101*a*, 101*b*. The primary optical devices are respectively spaced apart from the upper and lower boundary surface. If a primary optical device 22 has a plurality of primary optical elements 22*a*, it is preferably connected to the holding element with at least one or the outer primary optical element(s).

In order to enable a stable connection, a contact region between the primary optical device and the boundary surface has a certain extension/area, over which light can enter the holder and enter as unwanted stray light, for example, into an adjacent illumination unit.

Thus, in the example shown, light from the projection optical device 12 of the illumination unit 10 can enter the holding element 100 or the body 110 via the boundary surface 101*a* of the receiving through opening 101 and could thus enter the adjacent illumination unit 20 as undesired stray light.

Likewise, light from the projection optical device 22 of the illumination unit 20 could enter the holding element 100 or the body 110 via the boundary surface 102*b* of the receiving through opening 102 and could thus enter the adjacent illumination unit 10 as undesired stray light.

According to the invention, an overcoupling protective device 200 is therefore arranged in the body 110 between two adjacent receiving through holes 101, 102, wherein the overcoupling protective device 200 is formed from a through hole 201 in the body 110, wherein the through hole 201 of the overcoupling protective device 200 is delimited by two side faces 211, 212, which side faces 211, 212 face the receiving through holes 12, 22 in which the primary optical devices 12, 22 are arranged.

The side faces 211, 212 have light deflection means 220, 230, which are designed to deflect at least part, preferably all, of the rays of light entering the body 110 from a primary optical device 12, 22 facing the side face 211, 212 and contacting the boundary surface 101*b*, 102*a* opposite the side face 211, 212, and striking the side surface 211, 212, in such a way that this part of the rays of light does not enter the adjacent illumination unit 10, 20 or strike the secondary optical device 31, 32 of the adjacent illumination unit 10, 20.

Figure 7:
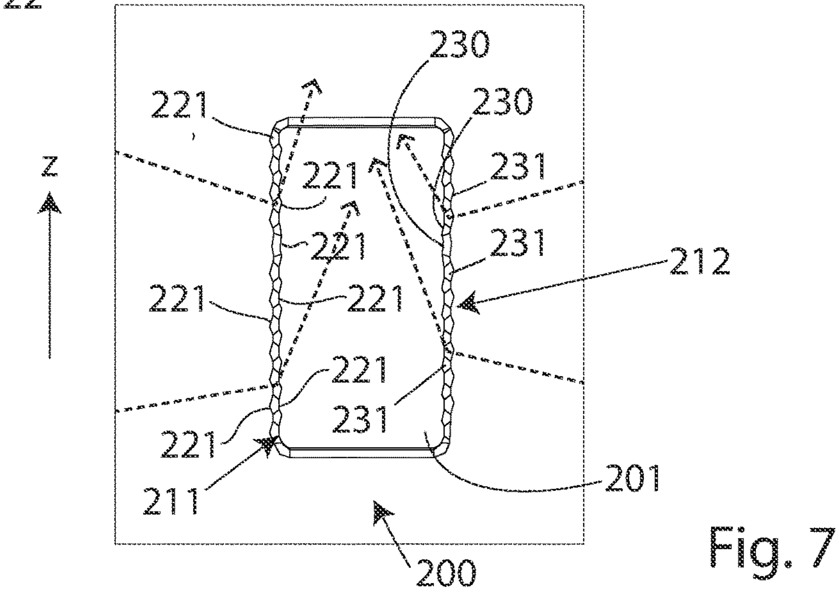
FIG. 7 shows a view of the holding element in the region of the overcoupling protective device in a view from the front.

As can be seen in FIG. 7, it is advantageously provided that the light deflection means 220, 230 are designed to deflect incident rays of light in such a way that the deflected ray of light has a greater up/down component (z component) than the incident ray of light.

Rays of light are thus deflected to a greater extent upwards or downwards and either propagate in the holding element or emerge from it, so far upwards or downwards and directed upwards/downwards that they do not strike the secondary optics or basically do not enter the adjacent illumination unit.

Figure 6:
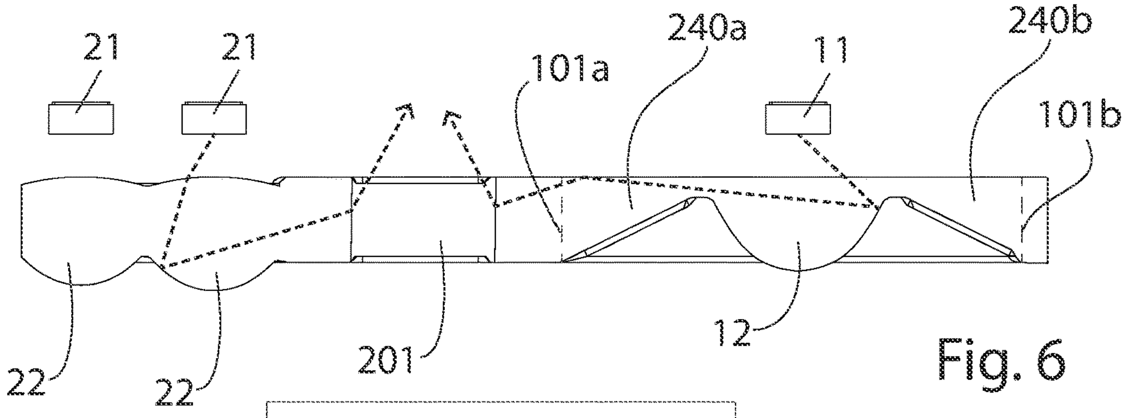
FIG. 6 shows a horizontal section through the holding element in the region of an overcoupling protective device.

Alternatively or preferably additionally, it is advantageously provided that the light deflection means 220, 230 are designed to deflect incident rays of light against the light emission direction X1, X2 of the respective illumination unit 10, 20 (FIG. 6).

In particular, it can be provided that the light deflection means 220, 230 comprise one or more light deflection surfaces 221, 231, which deflect the incident rays of light in such a way that these rays of light do not enter the adjacent illumination unit 10, 20 or strike a region of the secondary optical device 31, 32 that is associated with an adjacent illumination device 10, 20, and preferably has a deflection behaviour, described above, of the light rays striking the side surfaces 211, 212.

The side faces 211, 212 of the overcoupling protective device 200 lie, for example, vertically and are respectively parallel to the main light emission direction X1, X2 of the primary optical device 12, 22 of the adjacent illumination unit 10, 20.

For example, the side faces 211, 212 of the overcoupling protective device 200 are basically formed as flat surfaces on which the light deflection means 220, 230 are formed such that the resulting side face deviates from the flat shape.

For example, it can be provided that the light deflection means 220, 230 comprise grooves or are designed in the form of grooves in the base, wherein the grooves preferably extend in a horizontal direction, in particular parallel to the main light emission direction X1, X2 of the primary optical device 12, 22 of the adjacent illumination unit 10, 20.

As shown in the figures, the primary optical device 22 is directly connected to the boundary surface 102*b*, i.e. the outermost primary optical element 22*a* is directly connected to the boundary surface 102*b*.

In contrast, the primary optical device 12 is not directly connected to the boundary surface 101*a*, rather it is connected to the boundary surface 101*a* via a wedge-shaped contact element 240*a*. In this example, the primary optical device 12 is also connected to the second lateral boundary surface 101*b* with a second such contact element 240*b*.

A narrower wedge surface of the contact element contacts the primary optical device 12 whilst an opposite wider wedge surface contacts the boundary surface 102*a*. (FIG. 6)

The contact element is preferably formed from the same material as the holding element and the primary optical device; the holding element, contact element and primary optical device are preferably integrally formed with one another.

In this context, it should be pointed out that in the case of a single-piece design, in particular of the same material, a boundary surface does not exist in an actual material sense and is a notional surface.

The use of such a contact element also helps reduce stray light as in this way the size of the region with which the projection optical device is connected to the holder can be kept small.

Finally, it can be seen that, for example, a screen, in particular a wall-like screen 300, is arranged between two illumination units 10, 20, which screen 300 extends from the holding element 100 to the secondary optical devices 31, 32.

The screen 300 or the plurality of screens 300 and the holding element 100 preferably have an upper and a lower part, which can be put together on top of each other.

For example, the screen abuts the holding element 100 such that no light from the illumination unit can enter adjacent illumination units via a distance between the screens and the holding elements.

The one or more screens run approximately parallel to the main light emission direction of an adjacent illumination unit or parallel to the angle bisector of the main light emission direction of the two adjacent illumination units.

The one or more screens are, in particular, planar and run substantially vertically.

The invention claimed is:

1. An illumination device (1) for a motor vehicle headlight, the illumination device comprising:

at least two illumination units (10, 20) arranged next to one another, wherein each illumination unit (10, 20) respectively comprises:

at least one light source (11, 21);

a transparent primary optical device (12, 22) associated with the at least one light source (11, 21); and a transparent secondary optical device (31, 32), wherein the primary optical device (11, 22) of each illumination unit (10, 20) is designed to direct the light emitted by the at least one light source (11, 21) associated therewith onto the secondary optical device (31, 32) in such a way that at least one light distribution is produced by the secondary optical device (31, 32) of the illumination unit (10, 20), wherein the illumination device (1) has a holding element (100), which holds the primary optical devices (12, 22) of the illumination units (10, 20), wherein the holding element (100) is formed by a body (110) made of a transparent material, wherein the body (110) has adjacent receiving through holes (101, 102), the (12, 22) is respectively arranged, the (12, 22) is respectively attached to at least one boundary surface (101*a*, 101*b*, 102*a*, 102*b*) of the receiving through hole (101, 102), which faces an adjacent receiving through hole (101, 102), wherein the receiving through holes (101, 102) are spaced apart from one another, and wherein an overcoupling protective device (200) is arranged in the body (110) between two adjacent receiving through holes (101, 102), wherein the overcoupling protecting device (200) is formed by a through hole (201) in the body (110), wherein the through hole (201) of the overcoupling protective device (200) is delimited by two side faces (211, 212), which side faces (211, 212) face the receiving through holes (12, 22) in which the primary optical devices (12, 22) are arranged, and wherein at least one of the side faces (211, 212), namely that side face or those side faces (11, 12) whose opposite boundary surface of a receiving through hole (101, 102) is contacted by the primary optical device (12, 22) arranged in the receiving through hole (101, 102) has light deflection means (220, 230), which are designed to deflect at least part of the rays of light entering the body (110) from the primary optical device (12, 22) facing the side face (211, 212) and contacting the opposite boundary surface, and striking the side surface (211, 212), in such a way that this part of the rays of light does not enter the adjacent illumination unit (10, 20) or strike the secondary optical device (31, 32) of the adjacent illumination unit (10, 20).

2. The illumination device according to claim 1, wherein the holding element (100) and the primary optical devices (12, 22) are formed integrally.

3. The illumination device according to claim 1, wherein a primary optical device (12, 22) contacts the holding element (100) at exactly an opposite, boundary surfaces (101*a*, 101*b*, 102*a*, 102*b*).

4. The illumination device according to claim 1, wherein the light deflection means (220, 230) are designed to deflect incident rays of light in such a way that the deflected ray of light has a greater up/down component (z component) than the incident ray of light, and/or the light deflection means (220, 230) are designed to deflect incident rays of light against a light emission direction (X1, X2) of the respective illumination unit (10, 20).

5. The illumination device according to claim 1, wherein the light deflection means (220, 230) comprise one or more light deflection surfaces (221, 231), which deflect the incident rays of light in such a way that these rays of light do not enter the adjacent illumination unit (10, 20) or strike a region of the secondary optical device (31, 32) that is associated with an adjacent illumination device (10, 20).

6. The illumination device according to claim 1, wherein the side faces (211, 212) of the overcoupling protective device (200) respectively run parallel to a main light emission direction (X1, X2) of the primary optical device (12, 22) of the adjacent illumination unit (10, 20).

7. The illumination device according to claim 1, wherein the side faces (211, 212) of the overcoupling protective device (200) run vertically.

8. The illumination device according to claim 1, wherein the light deflection means (220, 230) are designed in the form of a grain or comprise grooves or are designed in the form of grooves.

9. The illumination device according to claim 1, wherein at least one of the primary optical devices (12, 22) comprises one or more primary optical elements (12*a*, 22*a*).

10. The illumination device according to claim 1, wherein the at least one primary optical device (12, 22) contacts the at least one boundary surface (101*a*, 101*b*, 102*a*, 102*b*) via a wedge-shaped contact element (240*a*, 240*b*), which is arranged between the boundary surface and the primary optical device (12, 22), and wherein a narrower wedge surface (240*a*, 240*b*) of the contact element (240*a*, 240*b*) contacts the primary optical device (12, 22) and an opposite wider wedge surface contacts the boundary surface.

11. The illumination device according to claim 1, wherein at least the light source (11, 21) of an illumination unit (10, 20), in particular of every illumination unit, is an LED or light-emitting diode, and wherein, if several light sources are provided, they are arranged in one or more rows.

12. The illumination device according to claim 1, wherein the at least one projection optical device (12, 22) or primary optical elements (12*a*, 22*a*) of the at least one projection optical device (12, 22) are biconvex.

13. The illumination device according to claim 1, wherein the secondary optical devices (31, 32) are formed as a secondary optical device assembly (30).

14. The illumination device according to claim 1, wherein a wall-like screen (300), is arranged between at least two illumination units, which screen (300) extends from the holding element (100) to the secondary optical devices.

15. A motor vehicle headlight comprising the illumination device (1) according to claim 1.

16. The illumination device according to claim 1, wherein the light deflection means is configured to deflect all of the rays of light entering the body.

17. The illumination device according to claim 2, wherein the holding element and the primary optical devices are made of the same material.

18. The illumination device according to claim 8, wherein the grooves extend in a horizontal direction, in a main light emission direction (X1, X2) of the primary optical device (12, 22) of the adjacent illumination unit (10, 20).

19. The illumination device according to claim 9, wherein every one of the primary optical devices (12, 22), comprises one or more primary optical elements (12*a*, 22*a*).

20. The illumination device according to claim 9, wherein at least one of the primary optical devices (12, 22) comprises two or more primary optical elements (12*a*, 22*a*) arranged in at least one row.

* * * * *